3,451,800
PRODUCTION OF GRANULAR SEWAGE SLUDGE
John W. Hudson, Atlanta, and Gerald D. Ferguson, Decatur, Ga., assignors, by mesne assignments, to USS Agri-Chemicals, Inc., Pittsburgh, Pa., a corporation of Delaware
No Drawing. Filed Apr. 30, 1965, Ser. No. 452,390
Int. Cl. C05f 7/00
U.S. Cl. 71—12       4 Claims

ABSTRACT OF THE DISCLOSURE

Sewage sludge which contains woolly fiber distributed therethrough is ground until about 95 percent of the material will pass a 50-mesh screen, and to the ground material is added about ½ to 1 percent of starch by weight, the mass being then heated by steam to a temperature of about 185–200° F. while tumbling the mass to form granules and then drying the granular product. The dried sewage sludge granules are smooth and have rounded non-dusting exterior surfaces.

---

This invention relates to the production of granular sewage sludge, and more particularly to a process for granulating dried sewage sludge to obtain strong non-dusting granules and to the product thereof.

Dried sewage sludge products now on the market are in the form of powders or very fine granular material. Under normal conditions, when the dried sewage sludge is spread as a fertilizer, it is sown broadcast or applied by a fertilizer spreader, and under such standard practices the material is exposed to poor distribution, particularly on windy days, because of its low density and fibrous nature.

Under a low power microscope, dried sludge has the appearance of dark, sandy rock containing large amounts of fiber. Some of the fiber is embedded in the particles and some appears to be free. Screening a portion of the sludge through a 20-mesh screen will remove a quantity of woolly fiber, but even if such fiber is separated, the fibers remaining embedded in the dried sludge act as a deterrent to all ordinary granulation processes. The woolly fibers embedded in the sludge particles not only cause the particles to be readily carried by wind and air currents in different directions, but also prevent the particles from responding to ordinary grinding and granulation processes. While unitary crystalline fertilizer materials may be granulated by known processes, dried sludge with its woolly-type fiber has for several decades resisted efforts to granulate it into uniform non-dusting granules. If it were possible to form a fully granular fertilizer from this material, obviously it could be distributed much more evenly, the heavier particles could better penetrate to the roots of turf and plants, and the rate of application could be controlled, with spreader settings duplicated more precisely.

We have discovered that the woolly fiber problem in dried sewage sludge can be solved by grinding all of the sludge in a hammer mill or similar equipment until approximately 95 percent will pass a 50-mesh screen, and then by mixing with the ground material a dry blend of about ½ percent starch and heating the same to a temperature at least as high as 185° F., the blended material can be granulated in a fertilizer granulator to obtain the maximum number of particles in the desired —8 +20 mesh screen range. The granulated products may then be dried in any suitable apparatus, such as, for example, a rotary gas-fired dryer. Apparently, by grinding all of the sludge until 95 percent will pass a 50-mesh screen, the fiber difficulty is overcome, and with the high temperatures of heat, a relatively small amount of starch is effective in producing the uniform, strong, non-dusting, granular product.

A primary object, therefore, is to provide a process for the production of a strong, non-dusting, granular product from sewage sludge. A further object is to provide a product which is relatively uniform, having new and important characteristics. A still further object is to provide a process in which the amount of starch employed can be reduced to a minimum through novel process conditions. Other specific objects and advantages will appear as the specification proceeds.

In one embodiment of our invention, we grind the dried sludge in a hammer mill or similar equipment until about 95 percent thereof will pass a 50-mesh screen. We prefer to grind all of the sludge simultaneously to the above condition. In test operations, screening the material to remove material larger than 50 mesh and grinding the +50-mesh fraction to pass 50 mesh, and recombining the fractions, was not as effective as using a completely-ground material. The starch is added as a binder to the dried sewage sludge prior to granulation, and the dried mass is fed to a granulator. Steam and water are added to the granulator. By heating the mass through the use of steam to a temperature of 185° F. or higher, we find that a strong starch bond is obtained while at the same time a small amount of starch, say, about ½ percent by weight is sufficient.

After granulation, it is found that the maximum number of particles are in the desired —8 +20 mesh screen range, and these granulated particles are dried in a rotary gas-fired dryer. The oversize particles are finely ground and mixed with the screened-out fines, and the same are recycled to the granulator.

The dried granulated particles in the —8 +20 mesh screen range are smooth granules with well-rounded exteriors and are uniformly-sized, strong and non-dusting granules. Such a product permits evenly-controlled application to lawns and other uses, employing the usual fertilizer applicators.

Specific examples illustrative of the process and product may be set out as follows:

Example I

A dried sewage sludge sample was first ground in a hammer mill until 95 percent passed a 50-mesh screen. The ground material was then dry blended with ½ percent cornstarch (No. 3005 starch, Corn Products Refining Company). The blended material was then fed to a T.V.A.-type granulator, water and steam being added to give a moisture content of 10 to 14 percent of dry weight of sludge and to maintain a temperature in the range of 185–195° F. At this temperature, the cooked starch produced the maximum number of particles in the desired —8 +20 mesh screen range. The granulated particles were dried in a rotary gas-fired dryer and the material in the —8 +20 mesh range was screened out as product. The oversize was finely ground and mixed with the fines and recycled to the granulator.

The product consisted of relatively uniform granules which were strong and non-dusting and which had smooth and well-rounded exteriors.

Example II

The process was carried out as described in Example I except that the dry mixture of ground sludge and starch was heated in the granulator to the temperature range of 190–200° F. The cornstarch in the proportion of slightly less than ½ percent was found to be effective in forming the granulated particles in the desired range of —8 +20 mesh.

While in the foregoing specification we have set out specific procedure and conditons in considerable detail for the purpose of illustrating embodiments of the invention, it will be understood that such details may be varied widely by those skilled in the art without departing from the spirit of our invention.

We claim:

1. In a process for granulating dried sewage sludge which contains woolly fiber distributed therethrough, the steps of grinding the sludge fibers until about 95 percent of the material will pass a 50-mesh screen, adding to the ground material about one percent of starch by weight, heating the mass with steam to a temperature of at least 185° F. while rotating the same to form granules, separating the granules from the fines, and drying the granular product.

2. The process of claim 1 in which the granules are screened to separate granules in the screen size of −8 +20 mesh, the oversize being ground and mixed with fines and recycled for regranulation.

3. In a process for granulating dried sewage sludge which contains woolly fiber distributed therethrough, the steps of grinding the sludge and fibers until about 95 percent thereof will pass a 50-mesh screen, adding to the ground material about ½ percent by weight of cornstarch, heating the mass with steam to a temperature in the range of 185–200° F. while rotating and tumbling the mass to form granules, separating the granules from the fines, and drying the granular product.

4. In a process for granulating dried sewage sludge containing woolly fiber distributed therethrough, the steps of grinding all of the sludge and fibers until 95 percent of the sludge material will pass a 50-mesh screen, adding to the ground material about ½ percent by weight of cornstarch, adding water to the mass and heating with steam to provide a moisture content of 10–14 percent of the dry weight of the sludge and to maintain a temperature in the range of 185–200° F. while tumbling the mass to form granules, separating the granules in the −8 +20 mesh screen range, and drying the same.

References Cited

UNITED STATES PATENTS 2,369,110  7/1940  Harford.
3,050,383  8/1962  Wilson _____ 71—11

DONALL H. SYLVESTER, *Primary Examiner.*

I. G. FERRIS, *Assistant Examiner.*

U.S. Cl. X.R.

71—13, 64